Dec. 19, 1967 P. M. JAFFE 3,359,210
GREEN-YELLOW EMITTING EUROPIUM ALUMINO SILICATE PHOSPHOR
Filed Oct. 12, 1964
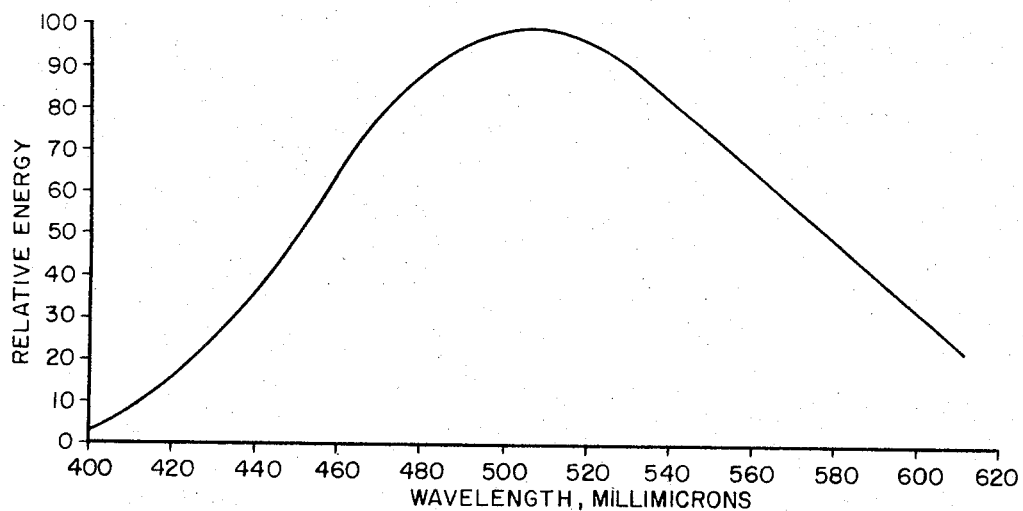
INVENTOR
Philip M. Jaffe
BY
W. D. Palmer
ATTORNEY

United States Patent Office 3,359,210
Patented Dec. 19, 1967

3,359,210
GREEN-YELLOW EMITTING EUROPIUM ALUMINO SILICATE PHOSPHOR
Philip M. Jaffe, Nutley, N.J., assignor to Westinghouse Electric Corporation, East Pittsburgh, Pa., a corporation of Pennsylvania
Filed Oct. 12, 1964, Ser. No. 403,136
4 Claims. (Cl. 252—301.4)

ABSTRACT OF THE DISCLOSURE

Phosphor composition is europium-aluminosilicate, $EuAl_2Si_2O_8$. The phosphor exhibits a green-yellow emission when excited by ultraviolet radiation.

---

This invention relates to phosphors and, more particularly, to an improved phosphor which is excited both by short wavelength ultraviolet and long wavelength ultraviolet in order to respond with a bright green-yellow emission.

Phosphors which respond to relatively short wavelength ultraviolet excitations and to relatively long wavelength ultraviolet excitations have utility in low pressure discharge devices, such as fluorescent lamps, as well as other types of discharge devices which generate longer wavelength ultraviolet radiations. A brighter emission obtained with such phosphors produces a brighter lamp and modified colors produced by such phosphors can be useful to produce a discharge device having a different color. The phosphor can also be used as a constituent of a phosphor blend, in order to produce new color effects.

It is the general object of this invention to provide a phosphor which responds with a bright green-yellow emission when excited either by short wavelength ultraviolet radiations or by relatively long wavelength ultraviolet radiations.

It is another object to provide an improved bright green-yellow phosphor which can be used either with a low-pressure vapor discharge device, or a high-pressure vapor discharge device, in order to improve the brightness of such discharge devices and to modify their colors.

The foregoing objects of the present invention, and other objects which will become apparent as the description proceeds, are achieved by providing a phosphor composition having the general formulation $EuAl_2Si_2O_8$. Preferred modes of preparation for such phosphor are also provided.

For a better understanding of the invention, reference should be made to the accompanying drawing wherein the sole figure illustrates the emission spectrum of the present phosphor under excitation either by 2537 A.U. or 3650 A.U.

While the present phosphor has particular utility with respect to discharge devices, it should be understood that the phosphor has utility in other applications where it is desired to convert ultraviolet radiations to visible radiations, such as a fluorescent display sign.

The phosphor of the present invention has the general formulation $EuAl_2Si_2O_8$. In preparing the phosphor, the raw-mix constituents are included in the respective molar amounts as desired in the final formulation. As an example, 0.5 gram mole of hydrated alumina $(Al_2O_3 \cdot xH_2O)$ is mixed as a slurry with silicic acid in such amount as to provide one gram mole of $SiO_2$, along with sufficient europium, added as europium nitrate, to provide 0.5 gram atom of europium. The slurry is dried, thoroughly mixed and fired in an ammonia atmosphere in a silica crucible at a temperature of from 1100° C. to 1450° C. for at least 15 minutes, with the lower the firing temperature the longer the firing time. The preferred firing temperature is from 1300° C. to 1350° C. and the optimum firing time is about 2 hours. The foregoing temperature ranges can be extended, if desired, and the firing time can be greatly extended, if desired.

The phosphor has the general formulation as indicated hereinbefore and it appears that this matrix is self-activated. The matrix $EuAl_2SiO_8$ can tolerate a slight excess of $SiO_2$ in its lattice as well as a slight deficiency of europium, although the best results are obtained with the preferred matrix as specified.

Under 2537 A.U. excitation, the present phosphor is about 40% brighter than the best manganese-activated zinc silicate, which has a slightly greener color. The brightness under 3650 A.U. excitation is only slightly less than that of silver-activated zinc-cadmium sulfide, which is an excellent phosphor with a similar color. The emission spectrum under such excitation is shown in the sole figure of the drawings.

In addition to the indicated ultraviolet excitations, the present phosphor also responds brightly to excitation under 2288 A.U. and 3261 A.U., thereby making it useful with low-pressure cadmium discharge devices, as well as mercury-discharge devices.

It will be recognized that the objects of the invention have been achieved by providing a bright green-yellow phosphor which efficiently responds to both relatively short wavelength and to long wavelength ultraviolet excitation.

In copending application S.N. 403,349, filed concurrently herewith by the present inventor, titled, "Green Phosphor" and owned by the present assignee, is disclosed a europium-activated europium aluminate. In copending application S.N. 403,389, filed concurrently herewith by the present inventor, titled "Blue White Phosphor," and owned by the present assignee, is disclosed a europium-activated alumina-silica phosphor.

While one best embodiment has been described in detail, it is to be particularly understood that the invention is not limited thereto or thereby.

I claim as my invention:
1. A phosphor composition having the general formulation $EuAl_2Si_2O_8$.
2. The phosphor specified in claim 1, wherein the phosphor raw mix is fired during phosphor preparation in an ammonia atmosphere.
3. The phosphor specified in claim 2, wherein the firing temperature is from 1100° C. to 1450° C.
4. The phosphor specified in claim 2, wherein the firing temperature is from 1300° C. to 1350° C.

References Cited
UNITED STATES PATENTS 3,140,251 7/1964 Plank et al. _____ 252—455
3,250,722 5/1966 Borchardt _____ 252—301.5

OTHER REFERENCES
Pringsheim-Fluorescence and Phosphorescence, 1949, page 458.

TOBIAS E. LEVOW, *Primary Examiner.*
R. D. EDMONDS, *Assistant Examiner.*